US007016062B2

(12) United States Patent

Ishizuka

(10) Patent No.: US 7,016,062 B2

(45) Date of Patent: Mar. 21, 2006

(54) APPARATUS, METHOD AND SYSTEM FOR PRINTING FROM A WIRELESS MOBILE DEVICE OVER THE INTERNET

(75) Inventor: Hiroaki Ishizuka, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 887 days.

(21) Appl. No.: 09/725,477

(22) Filed: Nov. 30, 2000

(65) Prior Publication Data

US 2002/0065873 A1 May 30, 2002

(51) Int. Cl.
*G06F 15/00* (2006.01)
*G06F 17/60* (2006.01)

(52) U.S. Cl. ....................................... 358/1.15; 705/26

(58) Field of Classification Search ................ 600/437; 358/437, 1.15; 382/313, 321; 705/26, 14, 705/27; 709/221, 229; 455/68, 41.1; 348/552

See application file for complete search history.

(56) References Cited

U.S. PATENT DOCUMENTS

| | | | | |
|---|---|---|---|---|
| 5,993,047 | A | 11/1999 | Novogrod et al. | 700/231 |
| 6,241,673 | B1 * | 6/2001 | Williams | 600/437 |
| 6,707,581 | B1 * | 3/2004 | Browning | 358/473 |
| 2002/0113994 | A1 * | 8/2002 | Smith et al. | 358/1.15 |

FOREIGN PATENT DOCUMENTS

| | | | |
|---|---|---|---|
| CN | 1364255 | A | 8/2002 |
| EP | 1 176 502 | A1 | 1/2002 |
| GB | 2 342 197 | | 4/2000 |
| WO | WO 00/05670 | | 2/2000 |

* cited by examiner

*Primary Examiner*—Kimberly Williams
*Assistant Examiner*—Saeid Ebrahimi-Dehkordy
(74) *Attorney, Agent, or Firm*—Oblon, Spivak, McClelland, Maier & Neustadt, P.C.

(57) ABSTRACT

A method for printing from a wireless mobile device over a computer network including transmitting to a wide area network (WAN) information a user wishes to print using a wireless mobile device. The transmitted information is received by the WAN and forwarded via the WAN to a printer selected by the user. The printer prints the forwarded information.

16 Claims, 7 Drawing Sheets

APPARATUS, METHOD AND SYSTEM FOR PRINTING FROM A WIRELESS MOBILE DEVICE OVER THE INTERNET

BACKGROUND OF THE INVENTION

1. Field of the Invention

The present invention relates generally to the use of wireless electronic devices, and more particularly to enabling a wireless electronic device to print information stored on the device via a wide area computer network such as the Internet.

2. Discussion of the Background

Wireless mobile electronic devices such as personal digital assistants (PDAs) and smart phones are electronic tools which enable users to connect to the Internet in order to access the wealth of information provided by the Internet. Users can conduct business transactions or utilize the Internet as a personal tool or resource. More particularly, users can surf the web, send and receive email, shop online, and even dispense negotiable instruments using wireless handheld devices.

In order to provide these functions, many wireless mobile electronic devices are capable of storing, processing, and displaying a substantial amount of information useful to the user. In many circumstances, this electronic information is useful to the user in a printed tangible form. However, in order to print information from the wireless devices, the wireless devices, in many cases, require a "wired" connection to a printer.

The inventor has realized that some wireless devices can function as a facsimile machine and send faxes via the public switched telephone network. However, in order to send information obtained from the Internet to a printer, two different connections are required. First, a connection must be made to the user's Internet service provider (ISP) in order to obtain the content the user wishes to print. A second connection via the public switched telephone network is required in order to send the facsimile data to a remote facsimile.

Other wireless devices are configured to transmit information to computer networks using infrared technology to connect to a local area network (LAN). However, transmissions using infrared technology and radio frequency (RF) signals have a limited transmission range when used as a LAN. Thus, the wireless devices must be proximate to a node of the LAN which is configured to receive the infrared or RF transmissions in order to transmit the information to be printed.

SUMMARY OF THE INVENTION

Accordingly, an object of the present invention is to provide a novel method and system for printing from a wireless mobile device over a computer network. In one embodiment, the Internet printing protocol (IPP) may be utilized. The IPP is an application level protocol that can be used for distributed printing using Internet tools and technologies.

Another object of the present invention is to provide a novel method and system for printing information stored on a wireless device to a default printer connected to the computer network by pushing a single PRINT button (i.e., one button printing).

Yet another object of the present invention is to provide a novel method and system for printing information stored on a wireless device to a printer selected by the user, wherein the user of the wireless device inputs the printer's network address.

Still yet another object of the present invention is to provide a novel method and system for printing information stored on the wireless device to a selected printer via a computer network and simultaneously staying online (i.e, printing information obtained on the computer network without disconnecting from the computer network in order to transmit print data).

These and other objects are achieved by providing a novel method and system for printing from a wireless mobile device over a computer network. The method, on which the system is based, includes transmitting to a wide area network (WAN) information a user wishes to print using a wireless mobile device. The transmitted information is received by the WAN and forwarded via the WAN to a printer selected by the user. The printer prints the forwarded information.

The method further includes controlling the printing via the WAN using IPP. IPP, enables, among other things, printing information stored on the wireless device to a selected printer via a computer network and simultaneously staying online.

The method further includes "one-button printing," wherein the wireless mobile device is configured to transmit the information to a default printer upon the user pressing a print button once. Alternatively, the method includes, prior to the user initiating the printing, selecting a printer connected to the WAN.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
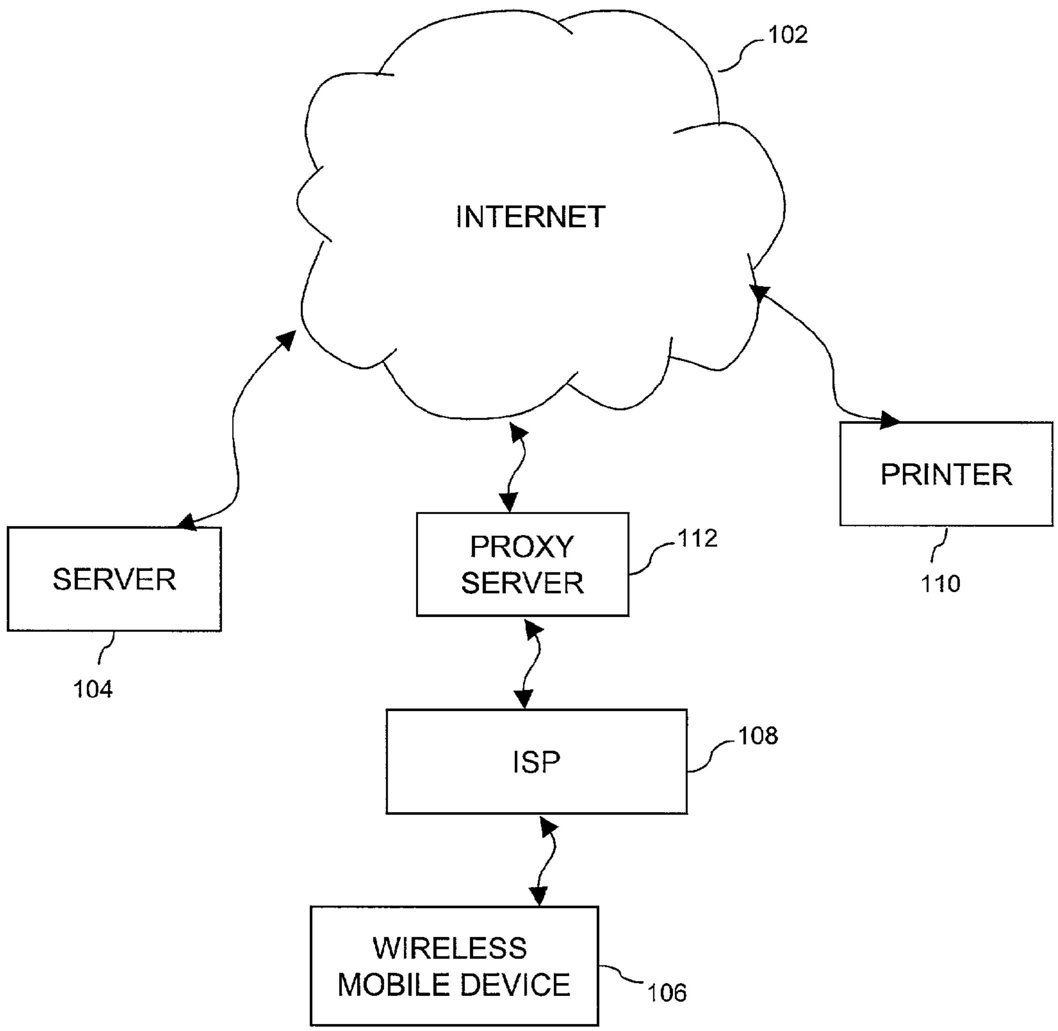
FIG. 1 is a networked system for printing from a wireless mobile device over a computer network.

Referring now to the drawings, wherein like reference numerals designate identical or corresponding parts throughout the several views, and more particularly to FIG. 1, there is illustrated a computerized system for printing from a wireless mobile device over a computer network. The computer network can be any network where not only computers are addressable, but peripheral devices such as printers have their own address. According to an embodiment of the present invention, the computerized system utilizes Internet 102 as a wide area network (WAN) backbone. The system further includes server 104, a wireless mobile device 106, an Internet service provider (ISP) 108, and a printer 110. The wireless mobile device 106 can be a wireless smart phone, a wireless personal digital assistant (PDA) or the like. An exemplary wireless device 106 according to an embodiment of the invention is described below with reference to FIG. 3.

The wireless mobile device 106 is configured to access the Internet via the ISP 108. The wireless mobile device 106 has a digital bi-directional connection with the ISP 108. After the wireless mobile device 106 connects to the Internet 102 via the ISP 108, users can surf or browse the Internet 102 using the wireless mobile device either directly, or with the assistance of a proxy server 112. The proxy server 112 processes and reformats content provided by Internet Web servers in order that the content provided by the server can be displayed on the display of the wireless device 106. In order to accomplish this task, the proxy server 112 first contacts the Internet Web server that hosts the page the user wishes to visit. The target page is then downloaded to the proxy server 112. The proxy server 112 then strips out the hypertext markup language (HTML) coding and changes it into special format that most wireless mobile devices can read. The proxy server 112 changes the graphics into a format that can be read by many wireless mobile devices as well. After the content has been processed and reformatted by the proxy server 112, the content is sent to the wireless mobile device 106 via the ISP 108. The ISP 108 not only provides Internet access to the wireless mobile device, but in many cases also provides email service. In many instances, the ISP 108 will be the user's wireless service provider.

Figure 2:
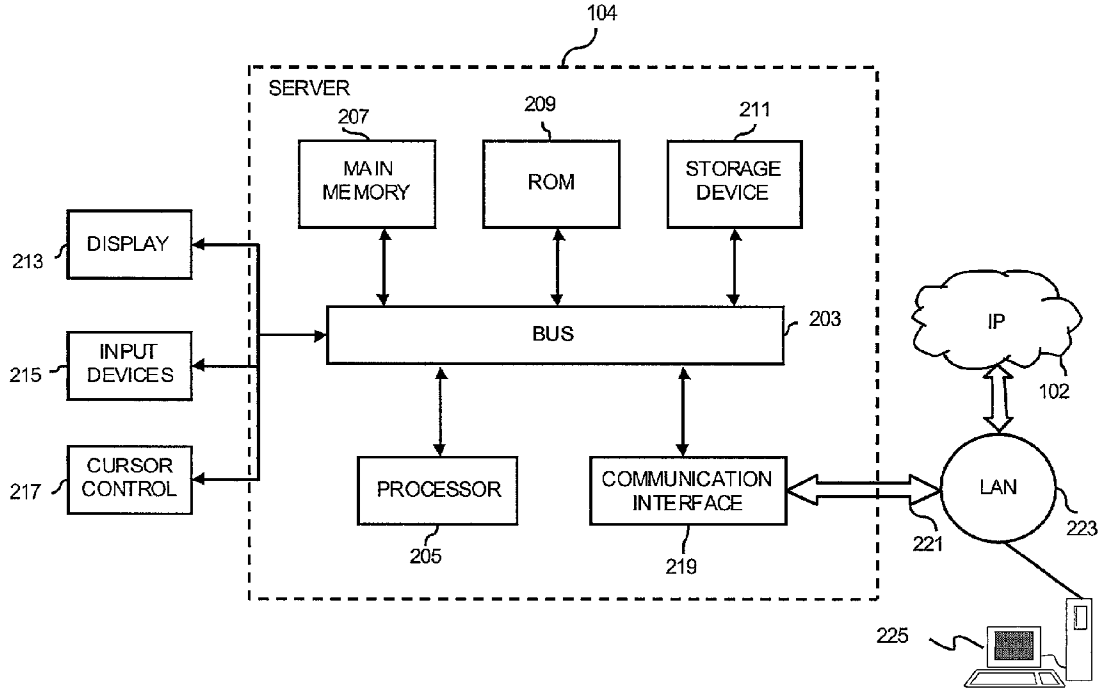
FIG. 2 is a schematic illustration of a server programmed to perform one or more special purpose functions of the present invention.

The server 104 is any suitable workstation or other device, such as the server 104 of FIG. 2, for communicating with the wireless mobile devices and addressable printing devices 110. The server 104 communicates with the wireless mobile devices (client) 106 via the Internet 102 using any suitable protocol. According to an embodiment of the invention, the wireless mobile device 106 uses the file transfer protocol (FTP) in order to download printer drivers from the server 104 to the wireless mobile device 106 via the Internet 102. The wireless mobile device 106 communicates with the printer 110 via the Internet 102 using IPP. IPP is an application level protocol that can be used for distributed printing. IPP enables, among other things, network devices such as the wireless mobile device 106 to request and to send print jobs to the printer 111 and the printer 111 to conduct error checks which determine whether or not the request to print is granted. The Internet printing protocol and the file transfer protocol are hereby incorporated by reference. An exemplary printer according to an embodiment of the invention is described below with reference to FIG. 4.

FIG. 2 illustrates server 104 which is an exemplary embodiment of the server 104 illustrated in FIG. 1. The server 104 includes a bus 203 or other communication mechanism for communicating information, and a processor 205 coupled with the bus 203 for processing the information. The server 104 also includes a main memory 207, such as a random access memory (RAM) or other dynamic storage device (e.g., dynamic RAM (DRAM), static RAM (SRAM), synchronous DRAM (SDRAM), flash RAM), coupled to the bus 203 for storing information and instructions to be executed by the processor 205. In addition, the main memory 207 may be used for storing temporary variables or other intermediate information during execution of instructions to be executed by the processor 205. The server 104 further includes a read only memory (ROM) 209 or other static storage device (e.g., programmable ROM (PROM), erasable PROM (EPROM), and electrically erasable PROM (EEPROM)) coupled to the bus 203 for storing static information and instructions for the processor 205. A storage device 211, such as a magnetic disk or optical disc, is provided and coupled to the bus 203 for storing information and instructions.

The server 104 may also include special purpose logic devices (e.g., application specific integrated circuits (ASICs)) or configurable logic devices (e.g., generic array of logic (GAL) or reprogrammable field programmable gate arrays (FPGAs)). Other removable media devices (e.g., a compact disc, a tape, and a removable magneto-optical media) or fixed, high density media drives, may be added to the server 104 using an appropriate device bus (e.g., a small computer system interface (SCSI) bus, an enhanced integrated device electronics (IDE) bus, or an ultra-direct memory access (DMA) bus). The server 104 may additionally include a compact disc reader, a compact disc reader-writer unit, or a compact disc juke box, each of which may be connected to the same device bus or another device bus.

The server 104 may be coupled via the bus 203 to a display 213, such as a cathode ray tube (CRT), for displaying information to a computer user. The display 213 may be controlled by a display or graphics card. The server includes input devices, such as a keyboard 215 and a cursor control 217, for communicating information and command selections to processor 205. The cursor control 217, for example, is a mouse, a trackball, or cursor direction keys for communicating direction information and command selections to processor 205 and for controlling cursor movement on the display 213.

The server 104 stores a plurality of printer drivers including UNIX, MAC, and Windows drivers. According to an embodiment of the invention, a generic printer driver specifically configured to enable the wireless mobile device 106 to print using the printer 110 is stored in the memory of the server 104. The server 104 also stores network addresses of printers accessible to the user. Associated with each stored address is the printer driver necessary to operate that printer.

According to an alternate embodiment of the invention, the printer addresses and the associated printer drivers are stored on alternate servers. This configuration enables distributed processing and memory if desired. Moreover, alternate servers enable the printer addresses and the associated printer drivers to be stored on servers protected by firewalls and accessible via the LAN 223.

As stated above, the server 104 includes at least one computer readable medium or memory programmed for storing the above described printer drivers and network printer addresses. Furthermore, stored on any one or on a combination of computer readable media, the present invention includes software for controlling the server 104, for driving a device or devices for implementing the invention. Such software may include, but is not limited to, device drivers, operating systems, development tools, utility software, and application software. Such computer readable media further includes the computer program product for performing all or a portion (if processing is distributed) of the processing performed in implementing the invention.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The term "computer readable medium" as used herein refers to any medium that participates in providing instructions to the processor 205 for execution. A computer readable medium may take many forms, including but not limited to, non-volatile media, volatile media, and transmission media. Non-volatile media includes, for example, optical, magnetic disks, and magneto-optical disks, such as storage device 211. Volatile media includes dynamic memory, such as main memory 207. Transmission media includes coaxial cables, copper wire and fiber optics, including the wires that comprise the bus 203.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave (described below), or any other medium from which a computer can read.

The server 104 also includes a communication interface 219 coupled to the bus 203. The communication interface 219 provides a two-way data communication coupling to a network link 221 that is connected to a local network (e.g., LAN 223). For example, the communication interface 219 may be a network interface card to attach to any packet switched local area network (LAN). As another example, the communication interface 219 may be an asymmetrical digital subscriber line (ADSL) card, an integrated services digital network (ISDN) card, or a modem to provide a data communication connection to a corresponding type of telephone line. Wireless links may also be implemented. In any such implementation, the communication interface 219 sends and receives electrical, electromagnetic or optical signals that carry digital data streams representing various types of information.

The network link 221 typically provides data communication through one or more networks to other data devices. For example, the network link 221 may provide a connection through LAN 223 to a host computer 225 or to data equipment operated by the ISP 108, which provides data communication services through Internet network 102 or any other suitable network using any known protocol (e.g., internetwork package exchange (IPX)). The LAN 223 and the Internet 102 both use electrical, electromagnetic or optical signals that carry digital data streams. The signals through the various networks and the signals on the network link 221 and through communication interface 219, which carry the digital data to and from server 104, are exemplary forms of carrier waves transporting the information. Server 104 can transmit notifications and receive data, including program code, through the network(s), the network link 221 and the communication interface 219.

Figure 3:
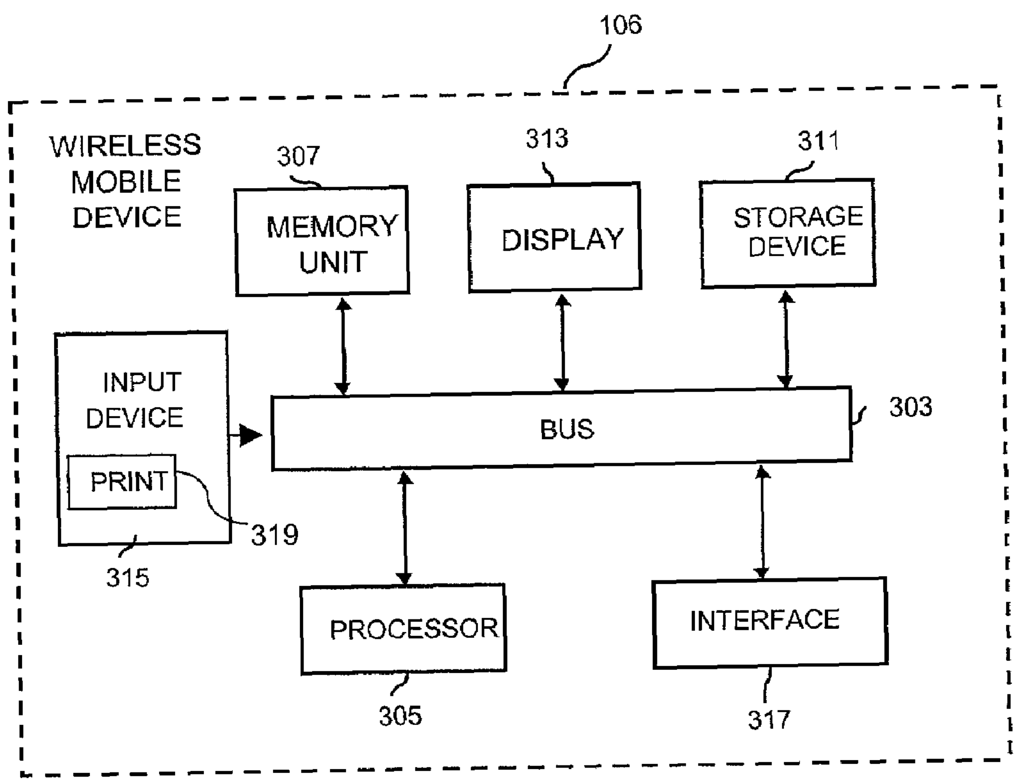
FIG. 3 is a schematic illustration of an exemplary wireless mobile device.

FIG. 3 is a block diagram of an exemplary embodiment of the wireless mobile device 106 of FIG. 1 to be used according to an embodiment of the present invention. FIG. 3 is intended to represent any one of a variety of small screen computers, although a larger screen wireless portable computing device such as a laptop computer may be utilized. Additionally, the wireless mobile device 106 may be a personal data assistant (PDA), cellular phone, or any other portable hand held device capable of uploading, downloading, storing, and manipulating digital information from a computer network.

Preferably, the wireless mobile device 106 includes a bus 303 or other communication mechanism for communicating information, and a processor 305 coupled with bus 303 for processing the information. Wireless mobile device 106 also includes a memory unit 307, such as a random access memory (RAM) or other dynamic storage device (e.g., dynamic RAM (DRAM), static RAM (SRAM), synchronous DRAM (SDRAM), flash RAM), coupled to the bus 303 for storing information and instructions to be executed by the processor 305. In addition, the memory unit 307 may be used for storing temporary variables or other intermediate information during execution of instructions to be executed by the processor 305. The memory unit 307 may further include a read only memory (ROM) or other static storage device (e.g., programmable ROM (PROM), erasable PROM (EPROM), and electrically erasable PROM (EEPROM)) for storing static information and instructions for the processor 305. The ROM may be depicted as a separate memory unit. A storage device 311, such as a magnetic disk, may be provided coupled to the bus 303 for storing information and instructions.

Wireless mobile device 106 also includes a display unit 313, such as a liquid crystal display (LCD), coupled to the bus 303 for displaying information to a user of the wireless mobile device 106. The wireless mobile device 106 includes an input device 315, such as an alpha-numeric keypad and/or cursor control, for communicating information and command selections to the processor 305. According to one embodiment of the present invention, the input device 315 includes a PRINT button 319 configured to initiate a process whereby the image and/or data shown on the hand held devices display unit 313 is printed by a default networked printer. This print button may be implemented using any desired structure. According to an alternative embodiment, the display unit 313 includes an icon configured to initiate printing. This graphical button may be engaged in any desired manner including through the use of a graphical pointing device such as a mouse, a pressure sensitive tablet, a pressure sensitive display, or using any desired device configured to imitate transmission of the information to be printed in response to single user command.

Figure 4:
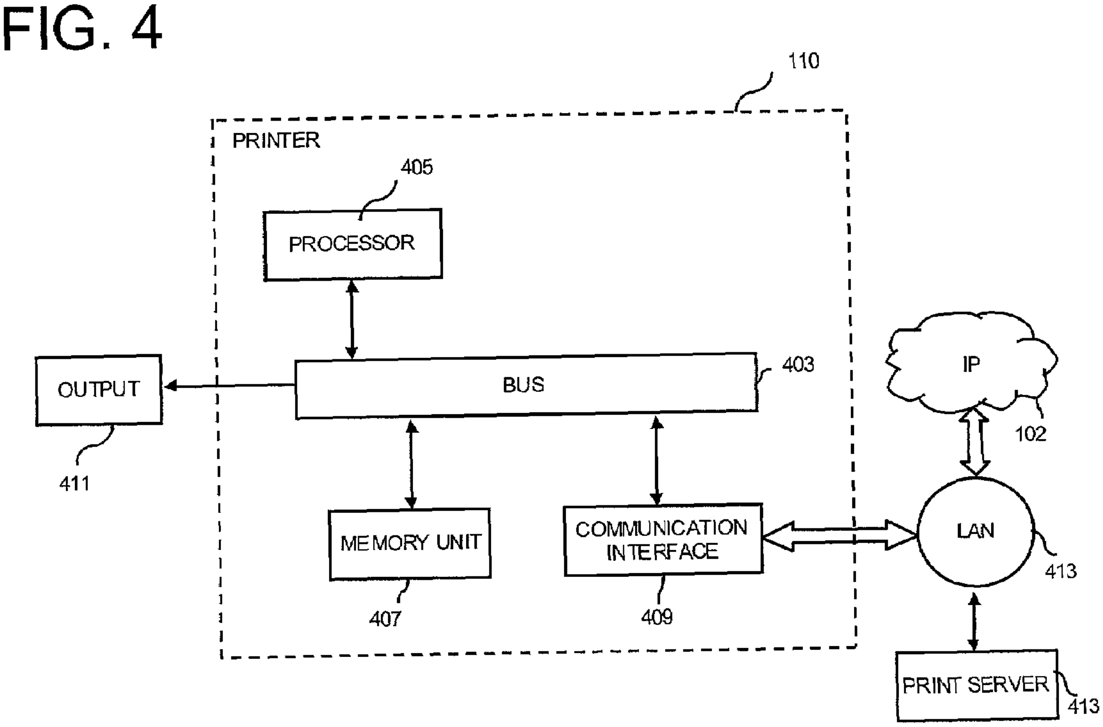
FIG. 4 is a schematic illustration of an exemplary printer.

FIG. 4 is a block diagram of an exemplary implementation of the printer 110 to be used according to an embodiment of the present invention. At a minimum, the printer 110 has limited processing, memory, and storage capabilities. The printer 110 is preferably addressable via a computer network. According to one embodiment of the invention, the printer 110 is a laser printer and includes a bus 403 or other communication mechanism for communicating information, and a processor 405 coupled with bus 403 for processing the information. The invention is not limited to using laser printers. Ink jet printers, impact printers, or any desired type of printer can also be configured to work in the disclosed system. The processor 405 receives signals via the computer network and determines where each image dot is to be placed on the paper to be output at 411. Instructions from the processor 405 rapidly turn on and off a beam of light from a laser in order to generate the image dots.

The printer 110 also includes a memory unit 407, such as a random access memory (RAM) or other dynamic storage device (e.g., dynamic RAM (DRAM), static RAM (SRAM), synchronous DRAM (SDRAM), flash RAM), coupled to bus 403 for storing bitmapped fonts sent via the computer network. In addition, the memory unit 407 may be used for storing temporary variables or other intermediate information during execution of instructions to be executed by the processor 405. The memory unit 407 may further include a read only memory (ROM) or other static storage device (e.g., programmable ROM (PROM), erasable PROM (EPROM), and electrically erasable PROM (EEPROM)) for storing static information such as default bitmaps (e.g., courier) and instructions for the processor 405. The ROM may be depicted as a separate memory unit.

The printer 110 also includes a communication interface 409 coupled to the bus 403. The communication interface 409 provides a two-way data communication coupling to a network link that is connected to a local network (e.g., LAN 413). For example, like the communication interface 219 of the server 104, the communication interface 409 may be a network interface card to attach to any packet switched local area network (LAN). As another example, the communication interface 409 may be an asymmetrical digital subscriber line (ADSL) card, an integrated services digital network (ISDN) card, or a modem to provide a data communication connection to a corresponding type of telephone line. Wireless links may also be implemented. In any such implementation, the communication interface 409 sends and receives electrical, electromagnetic or optical signals that carry digital data streams representing various types of information.

Print server 413 allows multiple nodes of the LAN 413 to share the printer 110. According to an embodiment of the invention, the print server 413 is also configured to function in the same manner as the server 104. That is, the print server 413 is configured to store the printer support files including the printer driver for the printer 110. Moreover, according to an alternative embodiment of the invention, the print server 413 interfaces with the printer 110 such that a specific printer driver is not needed. Rather, universally recognized files such as portable digital files (PDF), HTML files, and extensible markup language (XML) files are sent to the printer 110 via the print server 413. The print server 413 includes processing and memory which enables the printer server 413 to open PDF files using an Adobe Acrobat Reader and to print the file using the printer 110 regardless of the fonts, software, and operating system of the wireless mobile device 106. According to this embodiment, the wireless mobile device 106 converts the information to be printed into a PDF file using Adobe Acrobat software stored in memory unit 307 and then transmits the PDF file to the print server 413. According to an alternative embodiment, the processing of the PDF file can be accomplished in the processor 405 of the printer 110.

HTML and XML are both markup languages. Markup language files include directions that tell browsers how to display a document having graphics and/or text. According to an embodiment of the invention, the print server 413 includes browser software or the like configured to interpret HTML and XML files. Thus, when a user has identified information which she wishes to print, and the information is provided on the Internet 102 in an HTML or XML file, then the wireless mobile device 106 transmits the file to the print server 413 which interprets the file and subsequently sends the formatted information to the printer 110. It is to be noted that the invention is not limited to HTML or XML languages, but is adaptable and can be used with any markup language. According to an alternative embodiment, the processing of the markup language file can be accomplished in the processor 405 of the printer 110. In any event, PDF, HTML, and XML files enable wireless mobile device 106 to print using printer 110 whether or not the wireless mobile device is utilizing the printer driver associated with the printer 110.

Some print jobs however may require a setup process. According to an embodiment of the present invention, client print support files including printer drivers are downloaded to the wireless mobile device 106 from the server 104. Furthermore, according to an embodiment of the invention, the printer 110 utilizes IPP which is an object oriented protocol which enables the printer 110 to process requests from the wireless mobile device 106 and to return responses thereto. Internet Printing Protocol/1.0: Implementer's Guide describes many aspects of IPP. IPP enables error checks which determine whether or not a request to print is granted. IPP also provides the following operators including Print-Job, Validate-Job, Create-Job, and Send-Document.

Figure 5:
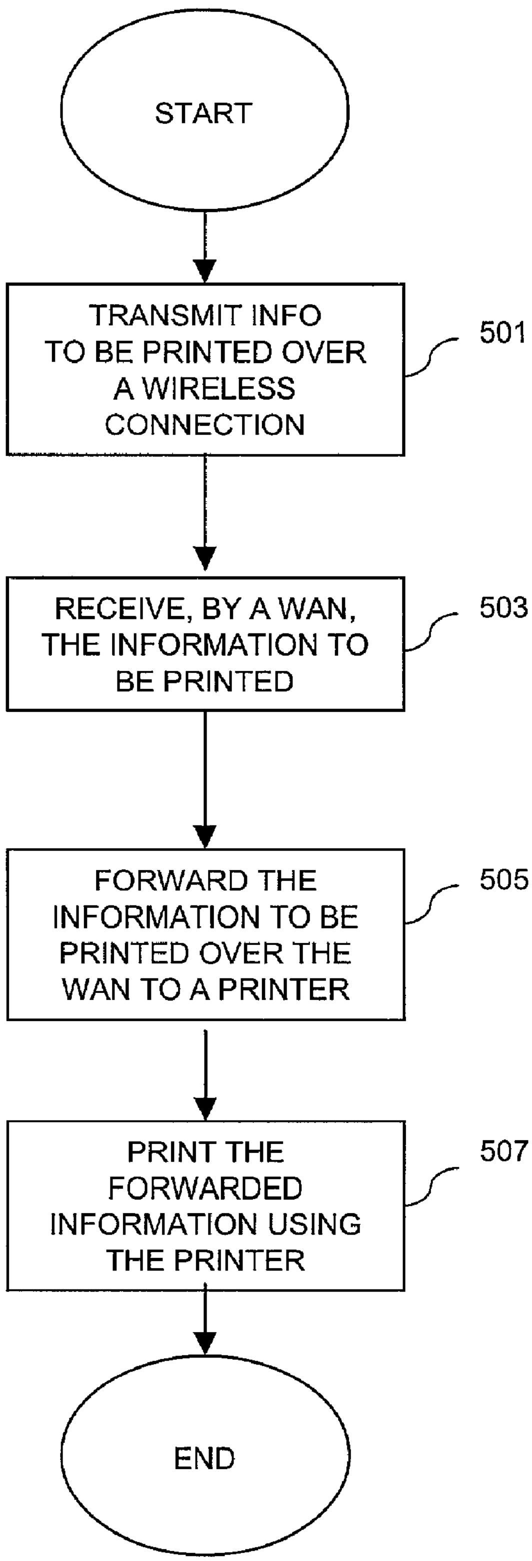
FIG. 5 is a flowchart describing the process for printing over a computer network according to one embodiment of the invention.

FIG. 5 is a flowchart describing the process for printing over a computer network according to one embodiment of the invention. In step 501, a user transmits information to be printed from a wireless mobile device over a wireless connection. The information to be printed is generated by browsing the Internet, shopping on the Internet, using email, or any other application software. For example, a user may shop online using the wireless mobile device 106 and print a shopping record or receipt of his shopping activity or the user may receive email on the wireless mobile device 106 and wish to print a hardcopy of the message.

In step 503, a wide area network receives the information to be printed which was transmitted over the wireless connection. The wide area network is primarily described herein as the Internet, but is not limited to such an embodiment. The wide area network can be any network spread among several buildings or locations, but is not limited to a single city. The wide area network includes a single network which is located in several cities. Moreover, the wireless mobile device 106 and the printer 110 may be at least one mile apart, five miles apart, 100 miles apart, or 100 or more miles apart.

In step 505, the wide area network forwards the information to be printed over the wide area network to the printer 110. The information is preferably provided to the printer 110 using IPP, but the present invention is not limited to such an embodiment. According to one embodiment, the printer 110 is a default printer such as the user's home or work printer. Consequently, the wireless mobile device 106 is configured to store the address of the printer 110 and any client print support files. Because the address of the default printer is known and the client printer support files are in the memory of the wireless mobile device 106, the user is able to print displayed information by pressing a single print button 319. Moreover, by using IPP, the information can be printed without disconnecting from the wireless mobile device 106. A further advantage is that the printed information will be awaiting the user at the site of the default printer (e.g., the user's home or office) upon the user's return to such location.

Figure 6:
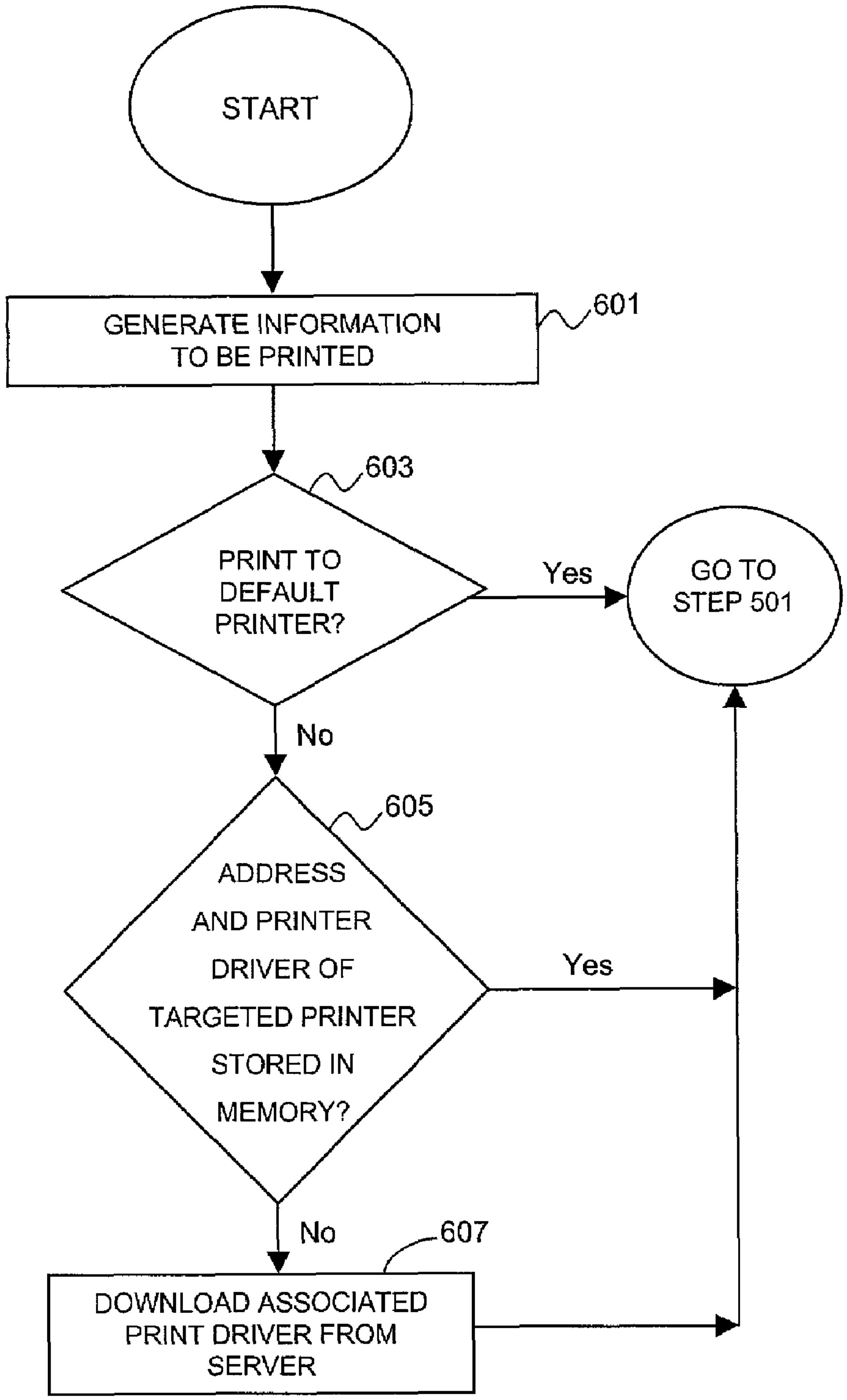
FIG. 6 is a flowchart describing the process for printing over a computer network according to a second embodiment of the invention.

FIG. 6 is a flowchart describing the process for printing over a computer network according to a second embodiment of the invention. In step 601, information to be printed is generated by browsing the Internet, shopping on the Internet, or using an email program provided by the ISP. In step 603, the user decides whether to print to the default printer. If the answer is yes, the process continues as described with reference to FIG. 5. If the user decides to print to a different printer, then in step 605 the user determines whether the address and print driver of the target printer is stored in the memory of wireless mobile device 106. If both the address and the associated print driver are stored in the memory of the wireless mobile device 106, then the user selects the address of the target printer and the process again continues as described with reference to FIG. 5. If the address and printer driver are not stored in the memory of the wireless mobile device 106, then in step 607 the user inputs the address of the target printer and the wireless mobile device 106 communicates with the server 104 in order to download the associated printer driver. Once the associated printer driver has been downloaded from the server 104, then the process continues as described with reference to FIG. 5.

Figure 7:
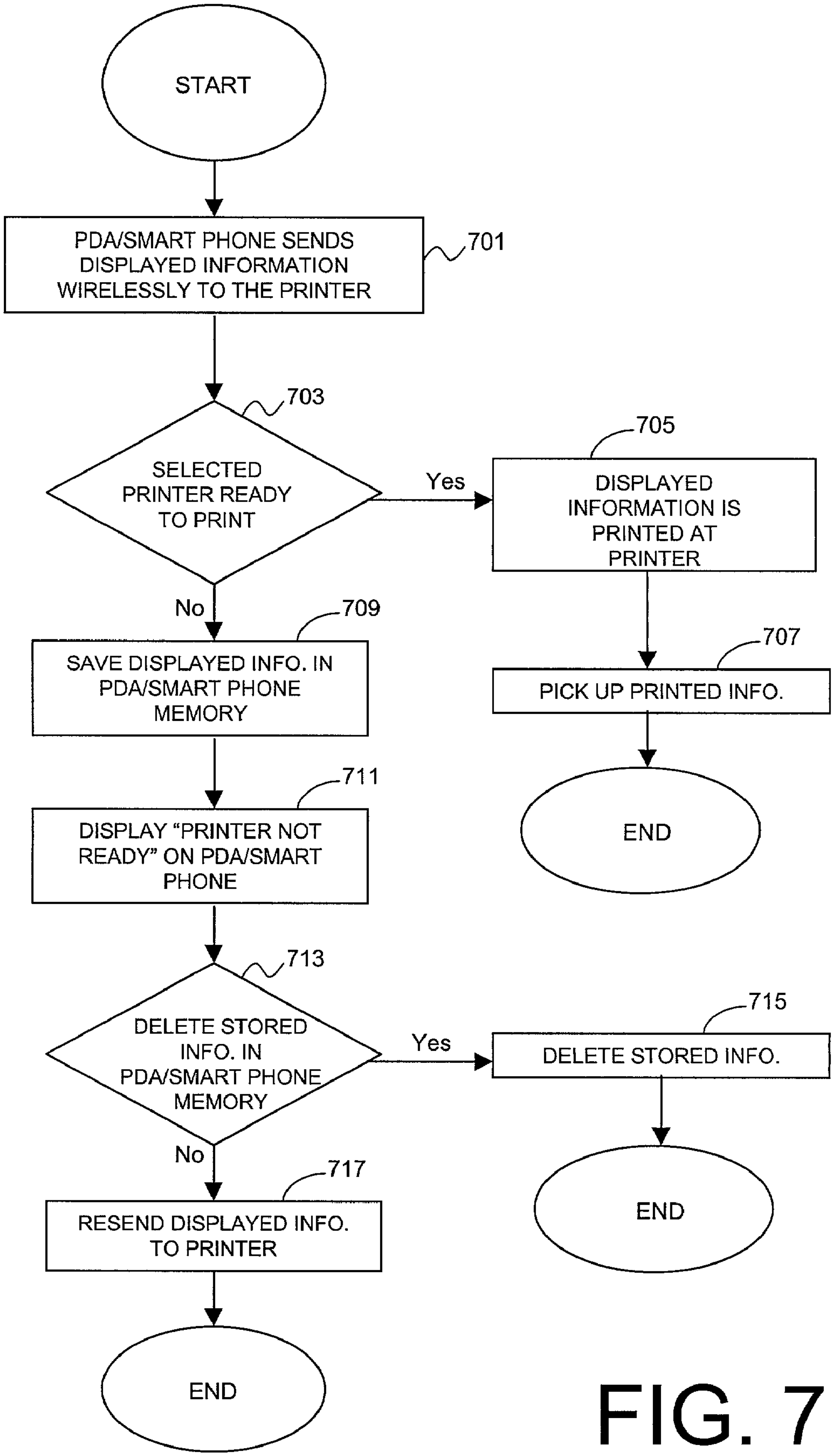
FIG. 7 is a flowchart describing the process for printing when the selected printer is "ready" or unable to print.

With reference to FIG. 7, a flowchart describing the process for printing, from the perspective of the wireless mobile device 106, when the selected printer is "ready" or unable to print is shown. In step 701, the wireless mobile device 106 sends a request to the printer 110 to print. In step 703, the printer 110 determines whether it is ready to print. This step includes determining whether to accept or reject the request to print. If the printer 110 accepts the request, then in step 705 the mobile device 106 sends the displayed information to the printer 110 and the user picks up the print job in step 707.

If the printer 110 rejects the request, then in step 709 the wireless mobile device 106 saves the displayed information in its memory. In step 711, the wireless mobile device 106 displays a "Printer not Ready" message. In step 713, the user determines whether to delete the displayed information. If the answer is yes, then the displayed information is deleted in step 715. If the answer is no, then the wireless mobile device 106 periodically attempts to resend the displayed information to the printer 110 until it is printed.

Obviously, numerous modifications and variations of the present invention are possible in light of the above teachings. It is therefore to be understood that within the scope of the appended claims, the invention may be practiced otherwise than as specifically described herein.

What is claimed is:

1. A method of printing information comprising:

transmitting information to be printed from a handheld computing device over a wireless connection to an Internet service provider;

receiving, through the Internet service provider and by a wide area network, the information to be printed which was transmitted over the wireless connection;

forwarding the same information transmitted from the handheld computing device to be printed over the wide area network to a printer;

if the printer is available printing the forwarded information using the printer;

if the printer is not available, saving the information in the handheld device, providing an indication of the printer not being available on the handheld computing device, allowing a user of the handheld computing device to delete the information to be printed, and if the user does not delete the information periodically attempting to resend the information to be printed to the printer.

2. The method according to claim 1, further comprising:

generating the information to be printed prior to transmission thereof.

3. The method according to claim 2, wherein the wide area network is the Internet and the generating comprises:

browsing the Internet for the information to be printed.

4. The method according to claim 3, wherein the browsing comprises:

shopping on the Internet.

5. The method according to claim 2, wherein the generating comprises:

generating the information to be printed using an e-mail program.

6. The method according to claim 1, wherein the forwarding includes:

controlling the printing using the Internet printing protocol (IPP).

7. The method according to claim 1, wherein the wireless mobile device is configured to transmit the information and the transmitting includes transmitting the information to be printed in response to a single user command.

8. The method according to claim 1, wherein the transmitting comprises selecting the printer connected to the wide area network in which to print to.

9. A system for printing information, comprising:

a wireless handheld mobile device configured to transmit, over a wireless connection, information to be printed to an Internet service provider;

a wide area network configured to receive the information from the Internet service provider and to forward the same information transmitted from the handheld computing device to a printer configured to print the forwarded information; and a controller configured to:

if the printer is available, print the forwarded information using the printer;

if the printer is not available, save the information in the handheld device, provide an indication of the printer not being available on the handheld computing device, allow a user of the handheld computing device to delete the information to be printed, and if the user does not delete the information periodically attempt to resend the information to be printed to the printer.

10. The system according to claim 9, wherein the wireless mobile device is configured to generate the information to be printed prior to transmission thereof.

11. The system according to claim 10, wherein the wide area network is the Internet and the wireless mobile device is configured to browse the Internet for the information to be printed.

12. The system according to claim 11, wherein the wireless mobile device is configured to enable a user to shop on the Internet.

13. The system according to claim 10, wherein the wireless mobile device is configured to generate the information to be printed using an e-mail program.

14. The system according to claim 9, wherein the wide area network is configured to control the printing using the Internet printing protocol (IPP).

15. The system according to claim 9, wherein the wireless mobile device is configured to transmit the information to be printed in response to a single user command.

16. The system according to claim 9, wherein the wireless mobile device is configured such that a user can select the printer connected to the wide area network in which to print to.

* * * * *